United States Patent [19]

Cassens, Jr.

[11] 3,816,146
[45] June 11, 1974

[54] REFRACTORY RAMMING MIX
[75] Inventor: Nicholas Cassens, Jr., Pleasanton, Calif.
[73] Assignee: Kaiser Aluminum & Chemical Corporation, Oakland, Calif.
[22] Filed: Oct. 20, 1972
[21] Appl. No.: 299,285

[52] U.S. Cl. ............ 106/58, 106/55, 106/59, 106/63
[51] Int. Cl. ............................. C04b 35/04
[58] Field of Search ............ 106/58, 55, 63, 59

[56] References Cited
UNITED STATES PATENTS
2,567,077   9/1951   Moon .................................. 106/58
3,026,211   3/1962   Cutler ................................ 106/58

*Primary Examiner*—James E. Poer
*Attorney, Agent, or Firm*—Paul E. Calrow; Malcolm McQuarrie

[57] ABSTRACT

A ready-to-use refractory ramming mix which contains fine periclase and which can be rapidly heated immediately after being formed is made from refractory aggregate and, as bond, a mixture of oil and wax. The composition may also contain high temperature bonding and sintering agents such as volatilized silica and chromic oxide.

12 Claims, No Drawings

REFRACTORY RAMMING MIX

BACKGROUND OF THE INVENTION

This invention concerns refractory ramming mixes, and particularly such mixes containing fine periclase.

Refractory ramming mixes are well known and used for forming monolithic refractory masses, for example the bottoms of furnaces such as electric steelmaking furnaces or open-hearth furnaces.

Heretofore, ramming mixes have generally been formulated as dry mixes by the refractories manufacturer, the user adding water to the mix on the job site to form a rammable mass. However, when the refractory mix contains MgO, for example in the form of periclase grain, particularly fine (e.g., −100 mesh) periclase, there is a tendency for the MgO to react with water added to the ramming mix to form magnesium hydroxide. The presence of water, either in the uncombined state or combined as magnesium hydroxide, requires particular care in "burning in" the refractory mass, in other words in heating it to the operating temperature.

First, the mass must be dried for some hours at a temperature slightly above 100°C to remove uncombined water. Too rapid heating of this water leads to the formation of steam which can disrupt the refractory. Beyond this point, the temperature must be raised slowly until all the magnesium hydroxide has decomposed, since again too rapid heating leads to formation of excessive internal steam pressure which can rupture the refractory.

The net result is that refractory ramming mixes using water require long heating periods before the furnace or other structure can be placed in use.

One solution to the foregoing problem is the use of an oil bond to make a ready-to-use refractory ramming mix, as set forth in more detail in U.S. Pat. application Ser. No. 193,147, filed Oct. 27, 1971, and owned by the assignee of the present application. However, it has been found that, although the composition of Ser. No. 193,147 overcomes the problems associated with use of water, the oil bond ignites when the refractory is heated to a temperature of about 500°C, and vigorously burns, giving off large flames. Sometimes this rate of burning is so vigorous as to disrupt the refractory.

The composition of the present invention overcomes this problem and may be considered an improvement in the composition of Ser. No. 193,147.

SUMMARY OF THE INVENTION

It has now been found, according to this invention, that a ready-to-use refractory ramming mix which can be rapidly burned in immediately after forming can be made from a composition consisting essentially of from 0.5 to 3 percent of a nonsetting oil having a pour point no higher than 0°C, a flash point of at least 100°C, a viscosity at 20°C of from 10 to 100 centipoises, a viscosity at 0°C of not over 1,000 centipoises, and a viscosity at 100°C of not less than 1 centipoise; and from 0.5 to 3 percent of a wax having a congealing point of at least 40°C; the remainder of the composition being refractory grain together with up to 3 percent bonding and sintering additives, at least 10 percent of the composition being hydratable refractory grain passing a 100 mesh screen; all percentages being by weight based on the total weight of the composition.

DETAILED DESCRIPTION

The refractory grain used may be any such material, but the advantages of the nonaqueous bond are achieved when the composition contains periclase, particularly fine periclase, or some other hydratable material. In a preferred form of the invention, all the refractory grain is periclase.

The oil used may be any such material having the specified rheological properties, and can be a petroleum oil. For reasons of economy, the oils known as base oils are particularly suitable, one such oil being sold under the name Chevron base oil 120. This oil shows a distillation of 50 percent upon heating to 300°C, and contains added anti-oxidants to raise its ignition temperature to about 500°C.

The wax can be any such material having the specified congealing characteristics. Petroleum based waxes are a preferred form of wax, particularly when the oil used is a petroleum oil.

While up to a total of 6 percent oil and wax can be used, it is preferred that the total amount of these two ingredients be less, for example about 3 percent. Thus, as the amount of oil in the composition is increased, the amount of wax will be correspondingly decreased. A particularly preferred composition contains about equal parts of oil and wax, more specifically about 1.5 percent of each.

The compositions of this invention can contain other bonding and sintering materials. For example they can contain a temporary bond such as a lignosulfonate bond, and can also contain high temperature bonding and sintering aids such as volatilized silica and $Cr_2O_3$, as is well known in this art.

In making compositions of this invention, the wax is added to the oil and the admixture heated until the wax is completely dissolved in the oil. The heated oil-wax mixture is then added to the grain, and the two mixed in suitable equipment such as a muller mixer. Alternatively, the wax can be added to the grain, or a portion of the grain, for example in a ball mill when the fine fraction of grain is being milled, and the oil then added to the wax and grain admixture.

The composition so formulated is then generally bagged and either stored or shipped directly to the user. The latter has only to open the containers of ramming mix, dump it out, and ram it into place in a furnace bottom or wherever desired.

After the composition is rammed in place, it can immediately be burned in. It has been found that the rammed composition can be heated to a temperature of 500°C at a rate as high as 200°C per hour, and then heated to the operating temperature of the furnace at a rate as high as 120°C per hour. Under these heating conditions, a rammed specimen of the composition 6 inches thick showed no disruption on burning in.

It can be calculated that, following the above heating schedule, a rammed lining of this composition can be heated to 1,650°C in about 12 hours. This burn-in time can be compared with that required for a widely used refractory ramming mix which is mixed with water for ramming. This latter mix requires 6 hours drying at room temperature prior to any heating, and must then be heated at a rate such that 1,650°C is not reached for 42 hours, a total of 48 hours before the furnace can be used. Thus, the composition of this invention can be burned in some four times as fast as a conventional ramming mix using water.

EXAMPLE

A composition of 96 percent periclase, 1.5 percent Chevron base oil 120, 1.5 percent Chevron slack wax 140, 0.75 percent pigment grade $Cr_2O_3$ and 0.25 percent volatilized silica was made by mixing the wax and oil, heating the combination to dissolve the wax, and adding the combination to the solid ingredients in a Muller mixer. The periclase had the following typical chemical analysis: 1.1% CaO, 2.1% $SiO_2$, 0.3% $Al_2O_3$, 0.4% $Fe_2O_3$, 0.3% $Cr_2O_3$ and (by difference) 95.8% MgO, and was sized so that all passed a 4 mesh screen and about 35% passed a 100 mesh screen. Volatilized silica and pigment grade $Cr_2O_3$ are well known materials of commerce and both substantially all passed a 325 mesh screen. Slack wax is made by chilling straight crude petroleum to precipitate the wax, which is then separated by filtering. Chevron slack wax 140 has a congealing point of 140°F, a flash point, COC, of 540°F, a specific gravity of 0.883, an oil content of 21 percent by weight, and is free of phenolic or unusual odor. Chevron base oil 120 has a dark color, a pour point of −40°F (−40°C), a flash point of 335°F (168°C), and a viscosity of 54 centipoises at 22°C.

After ramming at room temperature, this composition had a density of over 175 lbs/cubic foot (pcf), and when tested for cold crushing strength at room temperature after being heated to 850°C, had a strength of over 2,000 psi.

When this composition was rammed into 1 gallon cans and placed in a furnace and heated to 650°C in 10 minutes, and to 1,000°C in an additional hour, the mix began to burn with occasional flames after about 17 minutes heating (at a temperature of about 730°C), showed low continuous burning after about 40 minutes (at a temperature of about 800°C), the burning being ended after about 75 minutes (by the time 1,000°C was reached).

This very rapid burn-in of the composition according to this invention can be compared with the same rapid burn-in of a similar composition containing 3 percent Chevron base oil 120 and no wax. In this case, the composition began burning in less than 12 minutes (before a temperature of 700°C was reached), and within 33 minutes (at a temperature of 840°C) continuous long flames were bursting from the specimen. These long continuous flames continued beyond 44 minutes heating (until a temperature of over 900°C was reached), and intermittent burning continued until after 70 minutes (about 1,000°C). The specimen of this comparison mix without wax was severely ruptured after the burn-in test.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g., MgO, $SiO_2$, although the components may actually be present in various combinations, e.g., as a magnesium silicate.

What is claimed is:

1. A rammable refractory composition consisting essentially of from 0.5 to 3 percent of a nonsetting oil having a pour point no higher than 0°C, a flash point of at least 100°C, a viscosity at 20°C of from 10 to 100 centipoises, a viscosity at 0°C of not over 1,000 centipoises, and a viscosity at 100°C of not less than 1 centipoise; and from 0.5 to 3 percent of a wax having a congealing point of at least 40°C; the remainder of the composition being refractory grain, together with up to 3 percent bonding and sintering additives, at least 10 percent of the composition being hydratable refractory grain passing a 100 mesh screen; all percentages being by weight based on the total weight of the composition.

2. Composition according to claim 1 wherein the oil shows a 50 percent distillation when heated to 300°C.

3. Composition according to claim 1 wherein the hydratable refractory grain is periclase.

4. Composition according to claim 1 containing about equal parts by weight oil and wax.

5. Composition according to claim 4 containing about 1.5 percent oil and 1.5 percent wax.

6. Composition according to claim 5 wherein the hydratable refractory grain is periclase.

7. Composition according to claim 6 wherein the oil shows a 50 percent distillation when heated to 300°C.

8. Composition according to claim 7 wherein the oil is a petroleum base oil.

9. Composition according to claim 7 wherein the wax is a petroleum wax.

10. Composition according to claim 9 wherein the oil is petroleum base oil.

11. Composition according to claim 10 containing about 0.25 percent volatilized silica and 0.75 percent $Cr_2O_3$.

12. Composition according to claim 11 wherein all the refractory grain is periclase.

* * * * *